April 24, 1945.   H. K. DE WEERTH   2,374,587
MACHINE FOR COOKING, DEHYDRATING AND/OR COOLING FOODSTUFFS
Filed Dec. 3, 1943   2 Sheets-Sheet 1
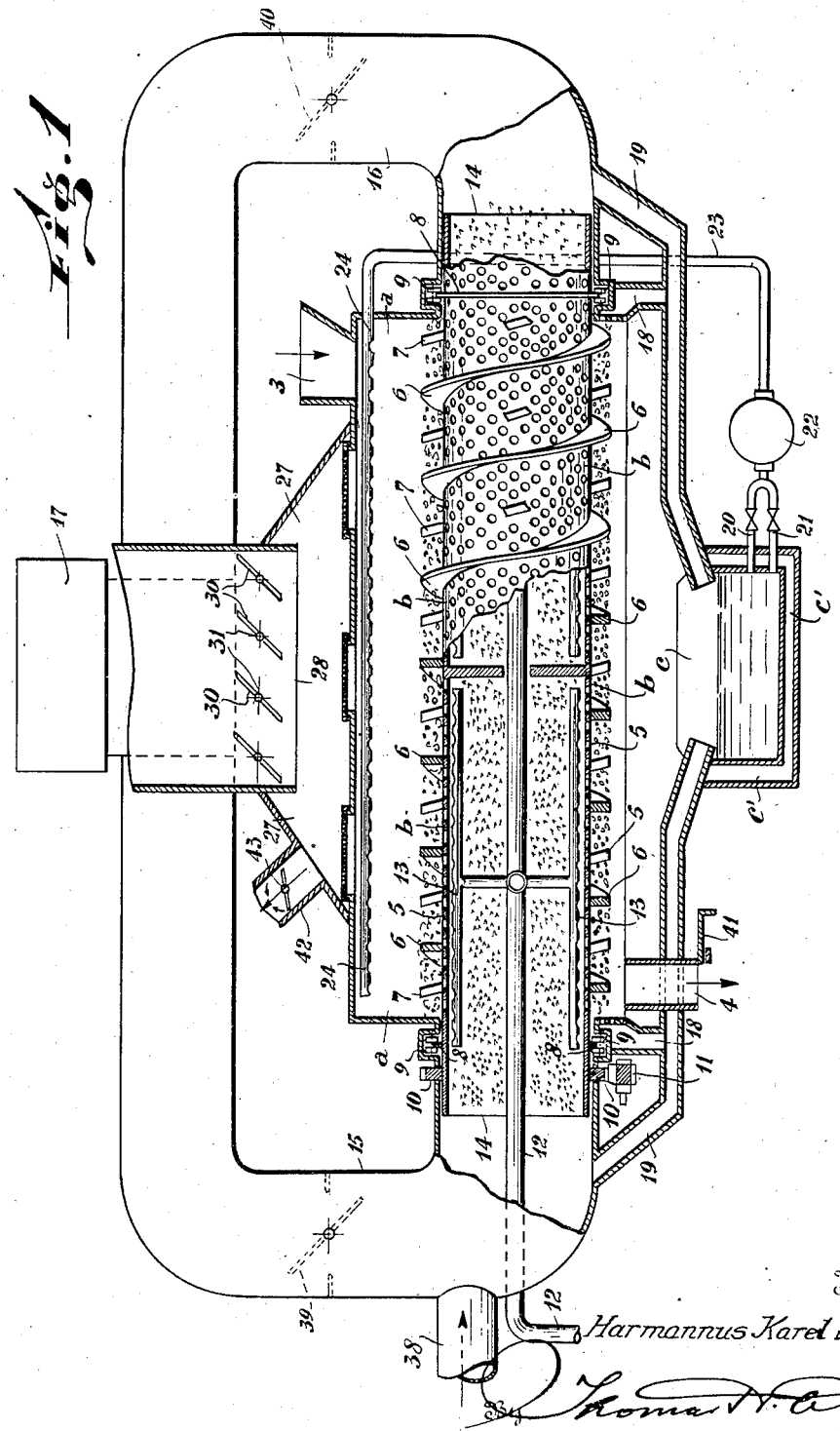
Inventor
Harmannus Karel DeWeerth
Thomas H. West
Attorney April 24, 1945.　　　H. K. DE WEERTH　　　2,374,587
MACHINE FOR COOKING, DEHYDRATING AND/OR COOLING FOODSTUFFS
Filed Dec. 3, 1943　　　2 Sheets-Sheet 2
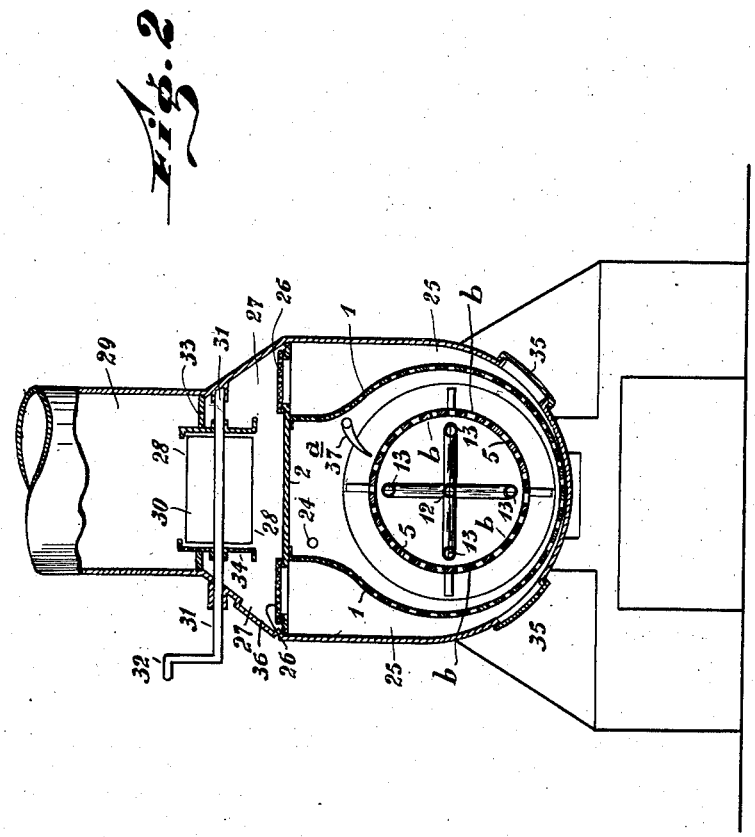
Inventor
Harmannus Karel De Weerth.

Patented Apr. 24, 1945

2,374,587

UNITED STATES PATENT OFFICE 2,374,587

MACHINE FOR COOKING, DEHYDRATING, AND/OR COOLING FOODSTUFFS

Harmannus Karel de Weerth, Buenos Aires, Argentina

Application December 3, 1943, Serial No. 512,736

7 Claims. (Cl. 99—246)

This invention relates to improvements in machines for cooking, dehydrating and cooling materials, and particularly to machines for cooking, dehydrating and cooling foodstuffs and the like.

My co-pending application Serial No. 458,888, filed September 18, 1942, discloses a machine for this purpose which comprises a cylindrical chamber having therein a rotary drum with perforated walls, so combined that the capacity of the machine will be determined by the space between the wall of said chamber and the perforated wall of the drum.

Said drum is equipped with heating means and also with means for receiving currents of air and other fluids, whereby it may be combined so as to obtain the cooking, dehydration and even the refrigeration or thermal conditioning during the process, by means of a double wall provided as a complement to the main chamber.

In this machine, however, direct draft is provided and it is therefore practically impossible to control the work during the different stages thereof, whereby the treatment of the material must be carried out by controlling the speed. This renders it difficult to obtain a continuous process.

The ideal thing in this type of machine would no doubt be the combination of means capable of establishing and maintaining suitably controlled heated and refrigerated atmospheres of any order of temperature, and this is achieved with the improvements subject of the present invention which, due to the special features and advantages thereof, renders the machine particularly well adapted for treating foodstuffs in a large scale.

The improvements of the present invention involve the substitution of the direct draft by a distribution which apart from passing through the walls of the chamber is provided with traps and valve means capable of trapping certain elements and enabling the regulation of the outlet, in such a manner as to maintain the atmosphere with a slight or high superpressure, depending on working conditions and requirements.

For this purpose, the outer walls of the drum are perforated in such a manner that the steam or fluid used for heating, cooling or dehydrating the product is directed in a divided manner towards lateral chambers from where it will rise to the outlet collector, after passing by a plurality of traps and control elements.

Apart from the above, the present invention contemplates other objects, amongst which may be mentioned the provision of means whereby it is possible to work with any charge in the drum, without the necessity of retarding or controlling the speed of the drum, since the passage of the operating fluids takes place through a plurality of perforations provided in the walls of the chamber.

A further object of the invention is to provide a simple and practical control which will enable the machine to work with any mass of material, thus rendering possible the use of the machine for treating different substances.

A further object of the invention is to provide means for cooking meat and other foodstuffs in a uniform manner and to the degree necessary for the preparation of preserved products not requiring tin cans or glass jars.

A still further object of the invention is to provide means for conditioning meat or other substances suitable for exportation without the necessity of extreme cooking, that is to say, with cooking points which will enable the shipping of the product in little above natural condition.

A still further object of the invention is to provide means whereby little or no agitation will be necessary during the treatment, due to the fact that the perforations provided in the walls of the chamber, will provide an even distribution of the air or fluid.

Other objects and advantages of the invention will become apparent from the course of the following description, when read in conjunction with the accompanying drawings illustrating the invention by way of example and in a preferred embodiment, and wherein:

Fig. 1 is a general view of the machine partially broken away so as to disclose the interior thereof;

Fig. 2 is a cross sectional view of the same machine, showing the arrangement of the fluid outlet.

The same reference characters are used to indicate like or corresponding parts or elements throughout both drawings.

As may be seen from the drawings, $a$ is a fixed chamber having a cylindrical bottom closed by side-walls $I$ and crown plate $2$, as shown in Fig. 2.

The inlet of said chamber $a$ is constituted by a hopper $3$, located on the upper portion thereof, while the outlet is constituted by a discharge mouth $4$ located at the bottom of said chamber.

Concentrically to the cylindrical curvature of chamber $a$ is a drum $b$ constituted by a suitably perforated hollow cylinder $5$. The outer surface of drum $b$ is provided with a helicoid 6 acting as a conveyor so that the material introduced through the hopper 3 will, upon rotating said drum b, advance towards the outlet 4, as shown in Fig. 1. Apart from the helicoid 6, the outer surface of drum b is provided with a plurality of fins 7 serving as stirring elements to change the position of the pieces of meat or other substances under treatment.

Said drum b is provided, in the vicinity of each end, with a set of rings 8 engaging on wheels 9 which constitute the rotary mounting for said drum. Towards one end of said drum b there is provided an annular gear 10 which meshes with a pinion 11 deriving from a suitable transmission serving to rotate the drum.

As stated above, drum b is hollow and a pipe 12 leads into same, said pipe serving to feed steam or air which is distributed by means of tubes 13, suitably perforated so that the fluid will project through the perforations in cylinder 5 constituting the body of the drum.

The open ends 14 of drum b are connected to conduits 15 and 16 constituting a branch from the lift-and-force pump 17 which should be capable of causing a current of air by projection or suction, as the case may be. The connection of the ends 14 of drum b with said conduits 15 and 16 are telescopic and without friction, in order to allow the free rotation of said drum.

Collectors 18 and 19 derive from the bottom of chamber a and from the lower portion of conduits 15 and 16, said collectors leading into a tank c having a double wall c' for heating purposes. As shown in Fig. 1, two pipes 20 and 21 located at different levels lead into said tank c, the opposite ends of said pipes being coupled to the inlet of a pump 22 so as to convey the juices again into chamber a through pipe 23 connected to the outlet of pump 22 and terminating in a shower 24, as described in the above-mentioned co-pending application.

Instead of having a direct draft at the upper portion thereof, chamber a is closed by said crown plate 2 and, as clearly shown in Fig. 2, the walls 1 of chamber a are provided with multiple perforations constituting multiple passages from said chamber to lateral auxiliary chambers 25. The upper portion of each auxiliary chamber 25 is provided with an outlet having a filter 26, and by means of said outlet the auxiliary chambers 25 communicate with a hood 27, the outlet 28 of which leading to chimney 29 is controlled by a shutter 30 mounted on a shaft 31 and controlled by means of a crank 32. As shown, said outlet 28, instead of deriving from the crown plate 33 of said chamber, starts at an intermediate zone of the cavity of said chamber, the crown plates being provided with partitions 34 so as to form a track which will intercept any particles of meat or other product which might be carried upwardly by the draft to chimney 29.

Said lateral auxiliary chambers 25 are provided with doors 35 for cleaning and draining purposes, while hood 27 is provided with an inspection door 36.

A comb 37 is fixed to the side walls of chamber a so as to remove the meat or other product being treated, which might adhere to cylinder 5 of the drum.

As shown in Fig. 1, said conduit 15 is connected to a pipe 38 by means of which air or any other suitable fluid may be fed for the purpose of cooling or otherwise treating the material, apart from the fluid which may be supplied by pump 17 as stated above.

Conduits 15 and 16 are each provided with a valve 39, 40, respectively, which serve for regulating the action of pump 17, and in case the latter pump is omitted, valves 39 and 40 may be closed so as to operate with only the fluid supplied through pipe 38.

*Operation*

As disclosed in my above-mentioned co-pending application, the meat or other product to be treated is fed through hopper 3, as indicated by the arrow in Fig. 1.

By means of the corresponding motor (not shown) transmitting its action to gear 10 through pinion 11, the drum b is rotated in the corresponding direction so that the helicoid 6 of said drum will act as a conveyor to admit the product which will fill the space between cylinder 5 and side-walls 1 of chamber a. In these circumstances, the outlet 4 should be kept closed by means of cover or door 41.

Once the space between the drum b and walls 1 of chamber a has been fully charged, in certain instances the action of drum b is changed so that instead of rotating in a single direction, the drum will be given an alternate motion with a semi-rotation in both directions, so that the helicoid 6 and fins 7 will suitably stir the mass of the product contained in the chamber. In other instances, the action may be continuous the comb 37 operating so as to separate the substances which might adhere to the cylinder 5.

Under these conditions, if the product is to be cooked, steam is supplied through pipe 12 so that by means of the perforated tube 13 said steam will pass through the perforations provided in cylinder 5 and through the mass of material, thus cooking same.

The juices released from the product will pass from the bottom of chamber a and lower portions of conduits 15 and 16, to collectors 18 and 19, and collected in tank c. If necessary, said juices may be returned to the product through the action of pump 22, pipe 23 and shower 24.

Inasmuch as the chamber walls 1 are perforated and constitute the only outlet of chamber a, the used vapours or fluids will pass through said perforations into auxiliary chambers 25, and since said auxiliary chambers have no free outlet, said vapours are accumulated in a pressure atmosphere which is communicated to said chamber a, whereby the heating is rendered effective and sufficient cooking for the conditioning of the product is obtained in a relatively short period of time.

This accumulation in the auxiliary chambers 25 is due to the resistance offered by the filters arranged in the outlets of said auxiliary chamber, apart from the partial closure which may be obtained by means of the shutter 30 controlling the outlet 28 to chamber 29.

The position of shutter 30 will depend on the requirements, that is to say, on the treatment to which the material should be subjected in the machine.

As stated above, should any particles of the material under treatment pass through the grid of filters 26, taken by the current established by the draft to chimney 29, said particles will be intercepted by means of the trap constituted by partitions 34.

Once the product has been cooked, the steam heat is cut off, and if the product requires drying or dehydrating, the fan or pump 17 is started so as to establish a passage of air between the interstices of the mass of the product, either by projection or suction, said passage of air being sufficient to evaporate the aqueous matter.

If the dehydrator is to work by projection, the fan or pump 17 should act so that the projected air will invade the hollow centre of the drum b, so that through the perforations in the walls of cylinder 5 thereof, said air will pass through the mass of the product and then through the perforations in sidewalls 1, the used air then passing to auxiliary chambers 25, through filters 26, hood 27 and chimney 29 through outlet 28, according to the position of shutter-valve 30.

On the other hand, if operating by ejection, the action of pump 17 is reversed, so that the suction will originate a vacuum zone in conduits 15 and 16, thereby causing a depression in the central portion of drum b whereby the air is compelled to pass thereinto.

If the treated product is to be canned or packed immediately after leaving the machine, refrigeration is applied so that while dehydrating, the product will be cooled to the required temperature.

This cooling action should preferably take place with the mechanical co-operation of the alternative or constant motion of drum b, so as to speed up the process.

During the cooling stage, instead of using a chimney as an outlet, the used air or vapours should leave direct from hood 27 through valve 43 provided in outlet 42.

Finally, by opening the door 41 and rotating the drum b, the latter will act as a conveyor in displacing the product towards outlet 4, through which it is discharged for disposal.

Summarizing, the invention combines the chamber in which the drum rotates, with an arrangement wherein the chamber walls are perforated so as to provide multiple passages communicating with auxiliary chambers 25 and establishing therein a superpressure atmosphere through the resistance offered by filters 26 and a suitable control of shutter-valve 30, thereby enabling the control of the cooking of the product.

It is evident that in carrying out the invention, many changes will occur to those skilled in the art, without departing from the scope of the invention as clearly set forth in the appended claims.

I claim:

1. Apparatus for cooking, dehydrating and cooling foodstuffs and other industrial products, comprising an elongated chamber, an inlet at one end of said chamber and an outlet at the opposite end thereof, a hollow rotatable cylindrical drum having perforated walls located within said elongated chamber, a spiral fin provided exteriorly of said drum for advancing said products from said inlet towards said outlet, means communicating with the drum for receiving heating, dehydrating and cooling fluids, and means arranged in the chamber exteriorly of the drum for exhausting said fluids, the last-mentioned means having an imperforate top wall and perforated side-walls, auxiliary lateral chambers communicating with said elongated chamber through a plurality of perforations in said side-walls, said auxiliary chambers leading to a chimney through trap means and control register means provided in said chambers.

2. Apparatus according to claim 1, wherein said auxiliary lateral chamber constitutes the only outlet from said elongated chamber through said plurality of perforations, said auxiliary chambers being provided with filter-grids constituting a resistance and throttle towards the exhaust passage.

3. Apparatus for cooking, dehydrating and cooling foodstuffs and other industrial products, comprising an elongated chamber, an inlet at one end of said chamber and an outlet at the opposite end thereof, a hollow cylindrical rotatable drum having perforated walls located within said elongated chamber, a spiral fin provided exteriorly of said drum for advancing said products from said inlet towards said outlet, means communicating with the drum for receiving heating, dehydrating and cooling fluids, and means arranged in the chamber exteriorly of the drum for exhausting said fluids, the last-mentioned means having an imperforate top wall and perforated side-walls, auxiliary lateral chambers communicating with said elongated chamber through a plurality of perforations in said side-walls, said auxiliary chambers communicating with a hood located between said auxiliary chambers and a chimney, the communication between said auxiliary chambers and said hood being throttled and provided with filter grids, the outlet of said hood being so arranged that the top of said hood is provided with partitions constituting traps for intercepting solid particles.

4. Apparatus according to claim 3, wherein the passage from said hood to said chimney is provided with a valve shutter having hand operated register and control means.

5. Apparatus according to claim 3, wherein said hood is provided with an additional direct outlet controlled by valve means.

6. Apparatus for cooking, dehydrating and cooling foodstuffs and other industrial products, comprising an elongated chamber, an inlet at one end of said chamber and an outlet at the opposite end thereof, a hollow cylindrical rotatable drum having perforated walls located within said elongated chamber, a spiral fin provided exteriorly of said drum for advancing said products from said inlet towards said outlet, means communicating with the drum for receiving heating, dehydrating and cooling fluids, and means arranged in the chamber exteriorly of the drum for exhausting said fluids, the last-mentioned means having an imperforate top wall and perforated side-walls, a comb member mounted in said chamber and arranged at the outer surface of said drum, auxiliary lateral chambers communicating with said elongated chamber through a plurality of perforations in said side-walls, said auxiliary chambers communicating with a hood located between said auxiliary chambers and a chimney, the communication between said auxiliary chambers and said hood being throttled and provided with filter grids, the outlet of said hood being so arranged that the top of said hood is provided with partitions constituting traps for intercepting solid particles, the passage between said hood and said chimney being provided with a valve shutter, said hood being provided with an additional direct outlet controlled by valve means.

7. Apparatus according to claim 6, wherein said auxiliary chambers and said hood are provided with inspection and cleaning doors.

HARMANNUS KAREL DE WEERTH.